July 17, 1956 E. H. DERRY 2,754,920
REVERSIBLE HUB FOR FANS
Filed June 29, 1953
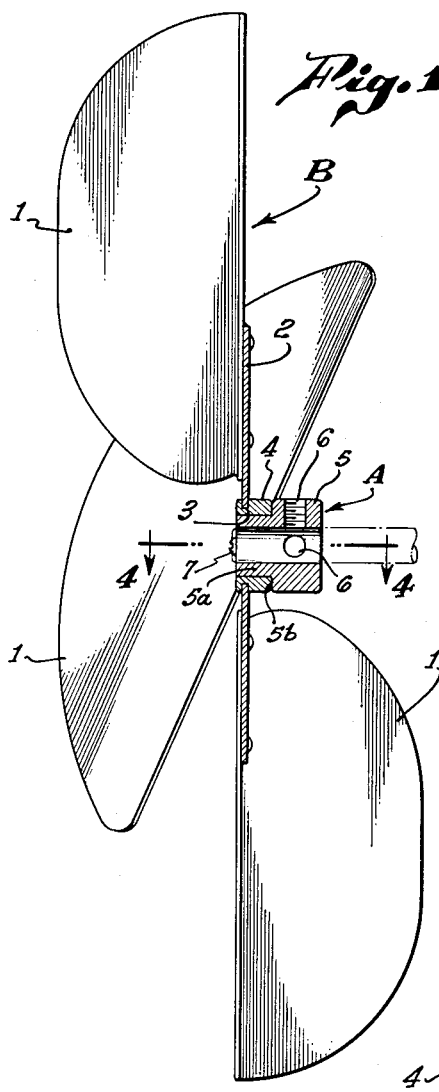
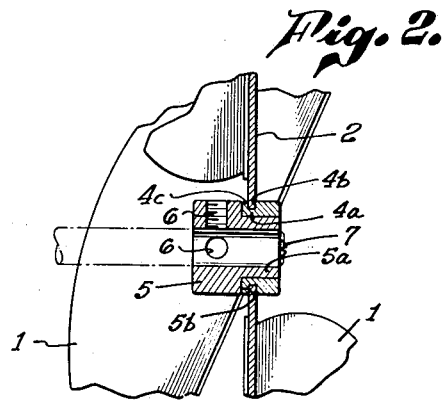
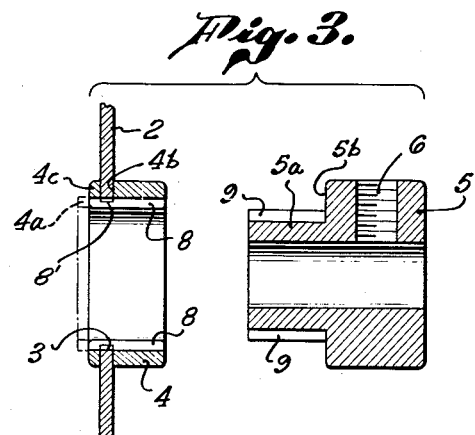
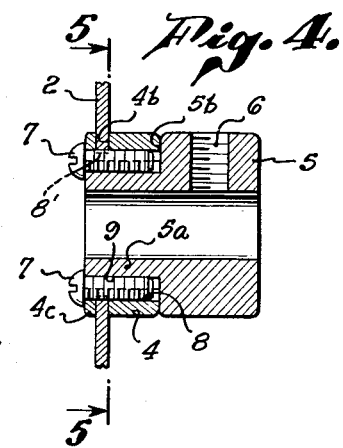
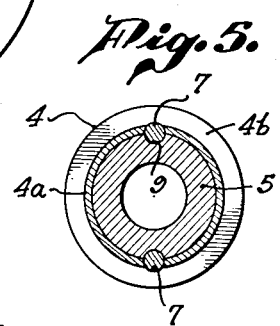
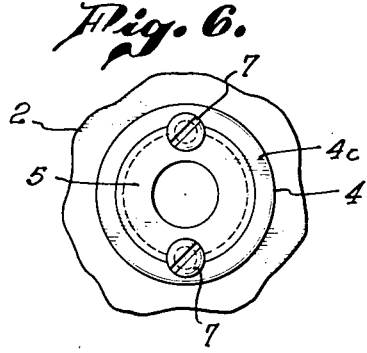
INVENTOR.
EMANUEL H. DERRY,
BY
Paul A. Weilein
ATTORNEY.

United States Patent Office 2,754,920
Patented July 17, 1956

2,754,920

REVERSIBLE HUB FOR FANS

Emanuel H. Derry, North Hollywood, Calif., assignor to Alan E. Burden Co., Inc., Los Angeles, Calif., a corporation of California Application June 29, 1953, Serial No. 364,676

11 Claims. (Cl. 170—173)

This invention relates to an improved hub construction for fans such as are used in connection with blowers and various types of cooling and air circulating apparatus.

It has been the practice to swage or otherwise fix one-piece hubs to the blade-supporting spiders of such fans. Accordingly, the hub of each fan is limited to application to a motor shaft of a diameter matching the bore of the hub. In view of the many sizes and types of fans presently in general use, this one-piece hub arrangement makes it necessary for fan dealers and jobbers to maintain a large inventory of fans and fan parts to meet customer requirements.

Moreover, the changing or replacement of the blades or hubs requires difficult dismantling of the hub assembly which in most instances is time consuming, costly and provides no assurance that the modified unit will have concentricity and balance.

In some installations where limited mounting space is available for a fan having the aforesaid one-piece hub, it is necessary to drill an access opening through the fan spider in order that an inclined bore for a set screw may be drilled and tapped in the hub. This inclined bore makes the set screw difficult of access and prevents the set screw from seating squarely against the shaft, thereby providing an unreliable fastening of the hub on the shaft.

It is an object of the present invention to provide an improved fan hub construction which will eliminate the objections and difficulties heretofore encountered and at the same time provide many advantages in a manner hereinafter described.

It is another object of this invention to provide a novel fan hub which readily and easily may be installed on either side of a fan to facilitate the mounting of the fan on a motor shaft and particularly where mounting space is limited or the type of fan makes it desirable to install the hub on one side of the fan in preference to the other.

It is a further object of this invention to provide a hub such as described which embodies two detachably connected hub parts wherein the part having the shaft-receiving bore is readily replaceable to provide different bore sizes without requiring removal of the other part from the fan spider. With this arrangement, it is only necessary for the fan manufacturers to provide different size bores in a number of the replaceable parts of the hub without changing the other dimensions of such parts, to make possible an easy installation of various sizes of fans on shafts of different diameters.

It is another object of this invention to provide a hub such as described in which the replaceable part may be inserted at either end of the part fixed to the hub spider optionally to provide a front hub or a rear hub without removing the fixed part.

Another object of this invention is the provision of a hub construction which will meet the most rigid specifications as to concentricity and balance when changing the hub parts to provide different bore sizes.

It is an additional object of this invention to provide a two-part hub such as described in which such parts are formed and coact to permit of the use of simple and readily operable fastening means for holding the hub detachably assembled.

A further object of this invention is the provision of a hub which upon being installed upon either side of the fan spider will provide for ready access to the set screw holding the hub on the shaft and enable the screw to set squarely on the shaft for a reliable holding action.

This invention possesses many other advantages and has other objects which may be made more easily apparent from a consideration of one embodiment of the invention. For this purpose there is shown one form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

Referring to the drawings:

Fig. 1 is a vertical sectional view of a fan provided with a hub embodying the present invention;

Fig. 2 is a fragmentary sectional view similar to Fig. 1, showing the hub reversed;

Fig. 3 is an exploded sectional view on an enlarged scale of the hub parts, showing the manner of assembling such parts on a fan;

Fig. 4 is a fragmentary sectional view on an enlarged scale, taken on the plane of line 4—4 of Fig. 1;

Fig. 5 is a cross sectional view taken on the plane of line 5—5 of Fig. 4; and

Fig. 6 is a fragmentary elevational view of the hub as assembled on a fan.

As shown in the accompanying drawing, a hub A embodying the present invention is installed on a rotary fan B. This fan includes blades 1 supported on a spider 2 having a central opening 3 to facilitate installation of the hub.

The hub A is adapted to be mounted on a motor shaft for driving the fan and is made of two tubular members 4 and 5. The member 4 is adapted to be fixed to the spider 2 with one end disposed in the opening 3. The member 5 is adapted to be detachably connected with the fixed member 4 so that it may be removed for substitution of a member corresponding thereto but having a different bore size. Threaded openings 6 are provided on the member 5 for reception of one or more set screws (not shown) to hold the hub on the motor shaft.

In having the member 5 removable from the member 4, replacement members corresponding to member 5 but having different bore sizes, readily may be mounted on the member 4 for installation of fans on shafts of different diameters, it being unnecessary to change the dimensions of the replacement members 5 except as to the bore size.

In order that the member 4 may be fixed to the fan spider 2 so that it will extend from either side of the spider as desired, the member 4 has a reduced end 4a providing a shoulder 4b for abutting one side of the spider. The reduced end 4a is swaged as at 4c against the other side of the spider thereby securely fixing the member 4 in place.

The hub member 5 is also provided with a reduced end portion 5a which defines a shoulder 5b. The reduced end portion 5a may be inserted into the bore of the member 4 so that the outer end thereof terminates substantially flush with the corresponding end of the member 4 when the shoulder 5b abuts the outer end of the member 4. If desired, however, the reduced end 5b may be inserted at the swaged end of the member 4 as shown in Fig. 2. Thus it is apparent that after installing the part 4, the member 5 may be mounted to provide a front hub or a back hub according to the mounting space available or the particular type of fan. When the member 5 is installed from the swaged end of the member 4 the shoulder 5b will abut this swaged end as shown in Fig. 2. Moreover, the member 4 may be initially installed so as to project from either side of the fan spider as desired and thereafter the member 5 inserted at either end of the member 4.

A novel fastening means is employed to detachably hold the hub assembled on the fan so that the removable hub member 5 may be easily detached and replaced without removing the fixed hub member 4. This fastening means includes a pair of self tapping screws 7 which become threadedly engaged with the members 4 and 5 as well as with the fan spider 2 upon appropriate turning of the screws so that they will extend between and engage opposed contacting portions of the members 4 and 5 as well as engage portions of the spider defining the margin of the opening 3.

The hub members 4 and 5 are prepared for the use of the self threading and self locking screws 7 so that the purchaser or user of the fan may, with an ordinary screw driver, remove and replace the hub section 5 to provide different bore sizes for shafts of different diameters. Accordingly, the member 4 after being swaged in place is drilled internally to provide longitudinal grooves 8 one hundred and eighty degrees (180°) apart. The grooves 8 are also cut as at 8' through portions of the spider 2 which define the margin of the opening 3. On the other hand the reduced portion 5a of the hub member 5 is preformed with similar interior grooves 9 extending longitudinally of the exterior thereof. These grooves 8 and 9 when brought into registration with one another will form screw receiving bores into which the self threading and self locking screws 7 may be turned so as to become threadedly engaged with the members 4 and 5 as well as the spider to securely hold these parts against relative angular and axial movement.

When it is desired to mount the fan on a shaft of a different diameter than that for which the bore of the member 5 is provided, it is only necessary to remove the two screws 7 and the set screw 6, in order to detach the member 5 for replacement by a member having corresponding dimensions as to diameter except as to the bore therethrough. The screws 6 and 7 are subject to reuse for reassembling the hub unit.

It is important to note that in replacing the member 5 having the desired bore size, it may be inserted and mounted at either end of the member 4.

While it is preferable to form the grooves 8 in the member 4 and spider 2 after the member 4 has been fixed to the spider, it is conceivable that these grooves could be formed before affixation of the member 4, provided that in swaging the member 4 care is exercised to avoid deforming the grooves to the extent that would make it difficult if not impossible to thread the screws 7 through the screw receiving bores formed by the grooves 8 and 9.

It will now be apparent that the two part hub unit of the present invention will provide the advantages hereinbefore described in a particularly efficacious manner.

I claim:

1. A rotary fan including: a spider; a pair of tubular members; means embodied in one of said members fixing said one member to said spider; the other of said members having a shaft-receiving bore extending therethrough; and screws extending between opposed axial surfaces of said members and threadedly engaged with said members and said spider for removably holding said other member in telescopic connection with said one member.

2. A hub for a rotary fan including: a pair of tubular members; one of said members having a reduced portion adapted to be extended through a hub-receiving opening in the spider of a fan and to be swaged thereto to fix said one member to said spider; the other of said tubular members having a reduced portion extensible into the bore of said one member from either end of said bore; said other member having a shoulder engageable with either end of said one member and having a through bore for reception of a drive shaft for the fan; and means extending axially between opposed axial surfaces of said member for removably securing said other member with its reduced portion engaged in the bore of said one member.

3. A hub for a rotary fan including: a tubular member adapted to be fixed to a fan; a tubular hub member having a portion disposed in the bore of said first mentioned tubular member; said tubular hub member being adapted to be mounted on a drive shaft for the fan; and a screw extensible between opposed axial surfaces of said members for detachably connecting said hub member with said first named tubular member.

4. A hub for a rotary fan including: a tubular member adapted to be fixed to a fan; a tubular hub member having a portion disposed in the bore of said first mentioned tubular member; said tubular hub member being adapted to be mounted on a drive shaft for the fan; and screws extensible between opposed axial surfaces of said members for detachably connecting said hub member with said first named tubular member; said hub member being insertable into either end of the bore of said first mentioned tubular member.

5. A hub for a rotary fan including: a tubular member adapted to be fixed to a fan; a tubular hub member having a portion disposed in the bore of said first mentioned tubular member; said tubular hub member being adapted to be mounted on a drive shaft for the fan; opposed portions of said members having complementary grooves therein forming screw-receiving openings extending axially of said members; and self threading screws adapted to be mounted in said screw receiving openings in threaded engagement with said members.

6. A rotary fan including a fan blade-supporting spider having a hub-receiving opening therein; a tubular member fixed to said spider with a portion thereof disposed in said opening; a tubular hub member having a portion disposed in the bore of said first mentioned tubular member; said tubular hub member being adapted to be mounted on a drive shaft for the fan; opposed portions of said member having complementary grooves therein forming screw-receiving openings extending axially of said members; and self threading screws mounted in said screw receiving openings in threaded engagement with said members and said spider.

7. A hub for a rotary fan including: a tubular member adapted to be fixed to a fan; a tubular hub member having a portion disposed in the bore of said first mentioned tubular member; said tubular hub member being adapted to be mounted on a drive shaft for the fan; said first mentioned tubular member having an internal groove extending axially from end to end of the bore thereof; said hub member having an external groove extending longitudinally of said portion thereof adapted to register with said first mentioned groove to provide a screw receiving opening between said members; and a screw insertible and adapted for said screw receiving opening in threaded engagement with said members.

8. A rotary fan including a fan blade-supporting spider having a hub-receiving opening therein; a tubular member fixed to said spider with a portion thereof disposed in said opening; a tubular hub member having a portion disposed in the bore of said first mentioned tubular member; said tubular hub member being adapted to be mounted on a drive shaft for the fan; said first mentioned tubular member having an internal groove extending axially from end to end of the bore thereof; said hub member having an external groove extending longitudinally of said portion thereof adapted to register with said first mentioned groove to provide a screw receiving opening between said members; and a screw mounted in said screw receiving opening in threaded engagement with said members as well as with a portion of said spider opposed to said screw-receiving opening.

9. A rotary fan including a fan blade-supporting spider having a hub-receiving opening therein; a tubular member having a reduced end portion inserted through said opening and swaged to said spider to fix said member on said spider; said member having internal grooves extending longitudinally from end to end of the bore thereof; a tubular hub member having a reduced portion disposed in said bore; said hub member having external grooves extending longitudinally of the reduced end portion thereof for forming with the first mentioned grooves screw-receiving openings; said spider having portions exposed in said screw-receiving openings; and screws mounted in said screw-receiving openings in threaded engagement with said members and said spider.

10. A hub for a rotary fan including: a pair of tubular members; one of said members adapted to be fixed to a fan; the other of said members being insertable into the bore of said one member and having a shaft-receiving bore; opposed surfaces of said members having complementary grooves extending axially of said members for reception of a fastening element to hold said members in assembled relation; and a shoulder on said other member engageable with an end of said one member.

11. A hub for a rotary fan including: a pair of tubular members; means embodied in one of said members providing for fixing said one member to a fan; the other of said members being insertable into the bore of said one member; said other member having a shoulder for abutting an end of said one member; said other member having a shaft-receiving bore therethrough; opposed surfaces of said members having complementary grooves therein extending axially thereof; and a screw in said grooves threadedly engaged with said members to hold said members in assembled relation.

References Cited in the file of this patent

UNITED STATES PATENTS

| | | |
|---|---|---|
| 1,509,523 | Monosmith | Sept. 23, 1924 |
| 1,999,326 | Forsyth | Apr. 30, 1935 |
| 2,041,555 | Lee | May 19, 1936 |
| 2,097,318 | Dowell | Oct. 26, 1937 |

FOREIGN PATENTS

| | | |
|---|---|---|
| 352,782 | Great Britain | July 16, 1931 |